US007492484B2

(12) United States Patent
Okuyama

(10) Patent No.: US 7,492,484 B2
(45) Date of Patent: Feb. 17, 2009

(54) IMAGE SIGNAL PROCESSING METHOD AND APPARATUS FOR LIMITING AMOUNT OF TONER STICK

(75) Inventor: Hiroyuki Okuyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 525 days.

(21) Appl. No.: 11/076,326

(22) Filed: Mar. 10, 2005

(65) Prior Publication Data

US 2006/0203268 A1 Sep. 14, 2006

(51) Int. Cl.
*G06K 15/00* (2006.01)
*H04N 1/40* (2006.01)

(52) U.S. Cl. ..................... 358/3.23; 358/3.13; 358/520; 358/521; 358/523; 358/524; 399/28; 399/41

(58) Field of Classification Search ................ 358/3.12, 358/521, 1.9, 3.1, 3.03, 14, 3.13, 3.23, 520, 358/523, 524; 399/37, 28, 41
See application file for complete search history.

(56) References Cited

U.S. PATENT DOCUMENTS 6,657,747 B1 * 12/2003 Shimamura ................. 358/1.9
7,099,046 B2 * 8/2006 Yamada et al. ............. 358/3.03
2003/0072035 A1 * 4/2003 Hagai et al. ................ 358/3.03
2004/0228642 A1 * 11/2004 Iida et al. ....................... 399/27
2005/0185008 A1 * 8/2005 Couwenhoven et al. ....... 347/14
2005/0206927 A1 * 9/2005 Yamada ...................... 358/1.9

FOREIGN PATENT DOCUMENTS

JP 2002-103689 A 4/2002

* cited by examiner

*Primary Examiner*—Twyler L Haskins
*Assistant Examiner*—Nicholas C Pachol
(74) *Attorney, Agent, or Firm*—Foley & Lardner LLP

(57) ABSTRACT

Even when an image signal is converted into an image signal with a limited amount of toner adhesion, the gradation is prevented from changing rapidly near the limiting value and therefore the image quality is prevented from deteriorating. An amount-of-adhesion converting circuit 301 converts image data for each color plane into first amount-of-toner-adhesion data. On the basis of a preset amount-of-toner-adhesion threshold value table, an amount-of-toner-adhesion reduction computing circuit 303 converts the first amount-of-toner-adhesion data for each color plane into second amount-of-toner-adhesion data with a limited amount of toner adhesion. Then, an image signal converting circuit 304 converts the second amount-of-toner-adhesion data into an image signal. In such a method, since parameters in the amount-of-toner-adhesion threshold value table are set arbitrarily, a rapid change in gradation can be suppressed near the limiting value.

14 Claims, 4 Drawing Sheets

IMAGE SIGNAL PROCESSING METHOD AND APPARATUS FOR LIMITING AMOUNT OF TONER STICK

BACKGROUND OF THE INVENTION

1. Field of the Invention

This invention relates to an image signal processing method and apparatus which limit the amount of toner adhesion, and more particularly to an apparatus effectively used in a color image forming apparatus, such as a color copying machine or a color printer.

2. Description of the Related Art

In the image signal processing section of a color image forming apparatus, there is provided a toner limiting section to limit the total amount of toner adhering to copying paper. The purpose of limiting toner is to prevent toner from being detached from the paper and unnecessary toner from remaining on the paper when color printing is done on a color printer.

If the maximum value of the sum total of the image signal values of cyan (C), magenta (M), yellow (Y), and black (B) is 400%, the sum total is normally limited to about 250%.

To achieve this limiting value, the sum total of the CMYK image signal values is compared with a threshold value. Then, when the sum total of the CMYK image signal values has exceeded the threshold value, the preferred values of the individual color signals and black signal are adjusted so as to limit the sum total of the CMYK image signals.

However, the above limiting method has the following problem: if an image includes pixel values equal to or larger than the threshold value, a rapid suppression (change) of gradation takes place, degrading the image quality. The technique for limiting the amount of toner adhesion has been disclosed in Jpn. Pat. Appln. KOKAI Publication 2002-103689.

In the technique disclosed in the patent document, the upper limit and lower limit which limit the image signal values are set. An image signal which exceeds the upper limit is forcibly converted into the upper limit. An image signal which is smaller than the lower limit is forcibly converted into the lower limit. Therefore, this technique has a problem: in an image which includes pixel values equal to or larger than the threshold value as described above, a rapid suppression (change) of gradation takes place, resulting in degradation of the image quality.

BRIEF SUMMARY OF THE INVENTION

An object of the embodiments is to provide an image signal processing apparatus which limits the amount of toner adhesion in such a manner that, even when an image signal is converted into an image signal with a limited amount of toner adhesion, the gradation is prevented from changing rapidly near the limiting value and therefore the image quality is prevented from deteriorating.

To achieve the foregoing object, an embodiment of the present invention comprises: converting image data for each color plane into first amount-of-toner-adhesion data; on the basis of a preset amount-of-toner-adhesion threshold value table, converting the first amount-of-toner-adhesion data for each color plane into second amount-of-toner-adhesion data with a limited amount of toner adhesion; and converting the second amount-of-toner-adhesion data into an image signal.

With such a method, since parameters in an amount-of-toner-adhesion threshold value table are set arbitrarily, a rapid change in gradation can be suppressed near the limiting value.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
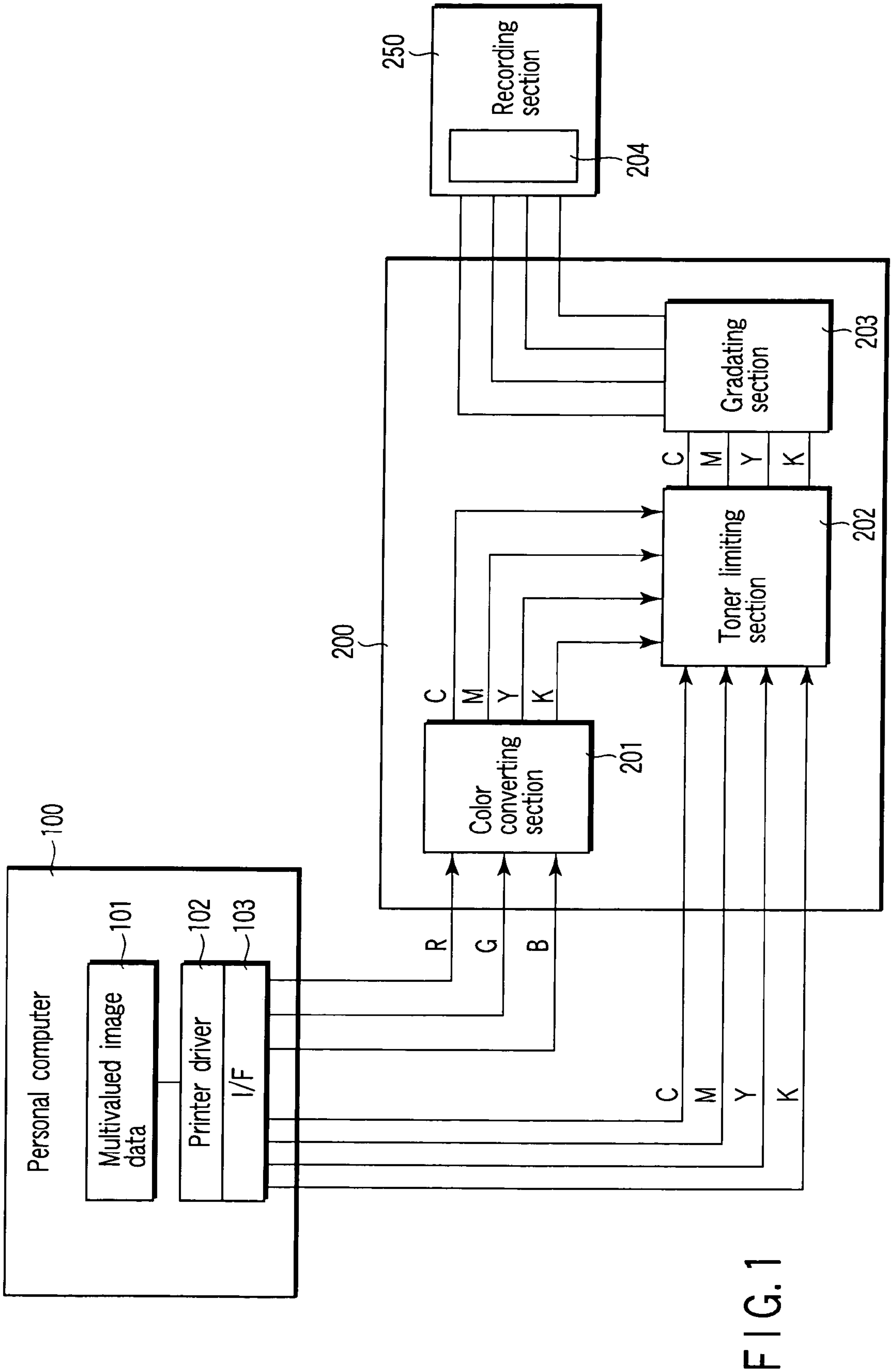
FIG. 1 is a diagram to help explain the basic configuration of an image forming apparatus to which the present invention is applied.

FIG. 1 shows a case where an image forming apparatus 200 to which the present invention has been applied is connected to a personal computer 100. The personal computer 100 transfers image data. When the image forming apparatus 200 prints out image data, the following data processing is performed.

The multivalued image data 101 stored in the personal computer 100 is sent to a printer driver 102. In the printer driver 102, print setting is done. The personal computer 100 can output not only image data R, G, B but also image data C, M, Y, K via an interface 103.

When image data R, G, B are output, the image data R, G, B are input to a color converting section 201 in the image forming apparatus 200. The color converting section 201 converts image data R, G, B into image data C, M, Y, K compatible for printing and outputs the image data C, M, Y, K.

In the color converting section 201, parameters that limit the values of the output image data C, M, Y, K are set. Normally, this prevents the values of the output image data C, M, Y, K from the color converting section 201 from exceeding the limit of the amount of toner adhesion. The image data C, M, Y, K from the color converting section 201 are input to a gradating section 203 via a toner limiting section 202.

Since the image data C, M, Y, K from the color converting section 201 have been subjected to the limitation of the amount of toner adhesion, the toner limiting section 202 outputs the image data C, M, Y, K without imposing further limitations on them. However, if the image data from the color converting section 201 are at a level which needs the limitation of the amount of toner adhesion, they can be subjected to double limitations.

On the other hand, the personal computer 100 can also output image data C, M, Y, K. In this case, the image data C, M, Y, K have not been subjected to the limitation of the amount of toner adhesion. The image data C, M, Y, K are input to the toner limiting section 202 and are subjected to the limitation of the amount of toner adhesion.

The output image data C', M', Y', K' subjected to the limitation of the amount of toner adhesion from the toner limiting section 202 are inputted to the gradating section 203 and are subjected to a gradating process to give a gradation representation. The output image data C', M', Y', K' of the gradating section 203 are input to a printer engine 204 in a recording section 250. Then, the printer engine 204 drives the print section of the recording section 250. The image data C', M', Y', K' function as signal values representing the amounts of toner adhesion.

Figure 2:
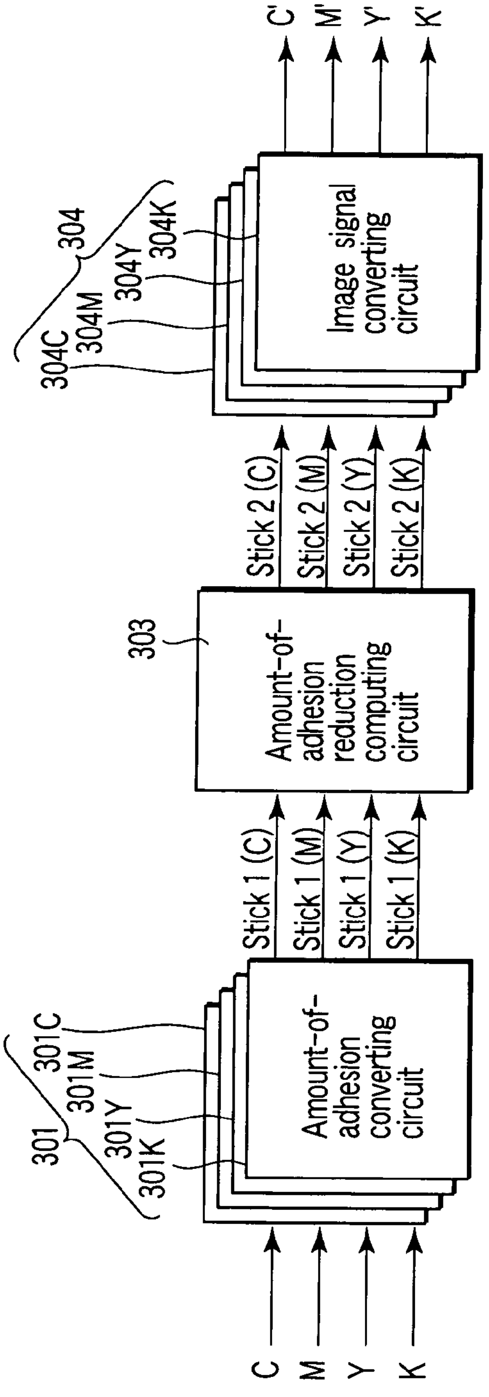
FIG. 2 shows an example of a concrete configuration of the toner limiting section 202 of FIG. 1.

FIG. 2 shows a concrete configuration of the toner limiting section 202. The input CMYK image signals are converted into amount-of-adhesion signals stick1 (*) (where * indicates CMYK) corresponding to the individual signals at amount-of-adhesion converting circuits 301 (301C, 301M, 301Y, 301K). The amount-of-adhesion signals stick1 (*) are input to an amount-of-adhesion reduction computing circuit 303.

Figure 3:
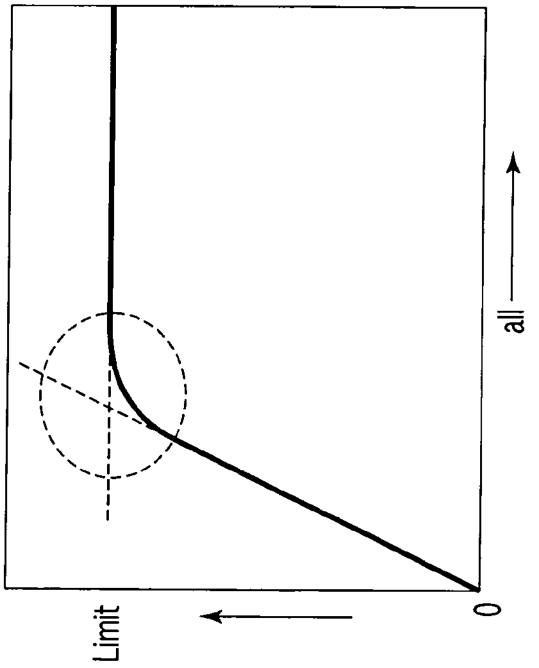
FIG. 3 shows an input/output characteristic of the amount-of-adhesion reduction computing circuit of FIG. 2.

In the amount-of-adhesion reduction computing circuit 303, a limiting value Limit corresponding to the total amount of adhesion of CMYK as shown in FIG. 3 is preset in the form of a look-up table. Then, in the amount-of-adhesion reduction computing circuit 303, each of the CMYK amount-of-adhesion values stick1 (*) is converted into the corresponding amount of adhesion stick2 (*) (where * represents CMYK) subjected to the limitation of the amount of adhesion.

At this time, computational expression is expressed as equation 1 given below. In the calculation, using a preset threshold value setting table value limit and each of the CMYK amount-of-adhesion values stick1 (*) (where * represents CMYK), the amount-of-adhesion value is reduced.

Finally, at an image signal converting circuit 304, the amount-of-adhesion values stick2 [*] subjected to the limitation of the amount of adhesion are converted into image signal values C', M', Y', K'.

In this method, the threshold value setting table is used as a look-up table, which enables free setting. This makes it possible to alleviate a rapid change in gradation in a color gamut near the limited amount of adhesion which occurred in the prior art. Example of setting at this time is shown in FIG. 3.

$$\text{stick2 } (C) = \text{stick1 } (C) - (|\text{all} - \text{limit}| \times \text{stick1 } (C)/\text{all})$$

$$\text{stick2 } (M) = \text{stick1 } (M) - (|\text{all} - \text{limit}| \times \text{stick1 } (M)/\text{all})$$

$$\text{stick2 } (Y) = \text{stick1 } (Y) - (|\text{all} - \text{limit}| \times \text{stick1 } (Y)/\text{all})$$

$$\text{stick2 } (K) = \text{stick1 } (K) - (|\text{all} - \text{limit}| \times \text{stick1 } (K)/\text{all})$$

where limit is the threshold value setting table value, $$\text{all} = \text{stick1 } (C) + \text{stick1 } (M) + \text{stick1 } (Y) + \text{stick1 } (K)$$

stick1 (*) is the amount-of-adhesion value before change, * indicating *CMYK*, and stick2 [*] is the amount-of-adhesion value after change, * indicating *CMYK*. (Expression 1)

As shown in FIG. 3, as the input image signal increases, the variation characteristic of the limited amount changes smoothly near the boundary (enclosed by a dotted line) between the area where the amount of toner adhesion increases proportionally and the area where the amount of adhesion is limited. That is, the variation characteristic of the limited amount does not change rapidly. Thus, in this apparatus, the image data of each color is converted into an amount-of-toner-adhesion signal. Next, on the basis of the amount-of-toner-adhesion threshold value table in which the amount-of-toner-adhesion signal for each color plane is preset, the amount of adhesion after the limitation of the amount of toner adhesion is calculated for each color plane. Thereafter, the amount-of-adhesion signal after the limitation of the amount of toner adhesion is converted into an image signal.

While in the embodiment, all of stick2 (C), stick2 (M), stick2 (Y), and stick2 (K) have been set as objects to be controlled, only stick2 (C), stick2 (M), and stick2 (Y) may be used to calculate the above characteristic. The reason is that, even if black is set as an object to be calculated, there is a possibility that deterioration of black character reproduction will take place in an image after printing. In addition, the new approach produces the effect of decreasing the memory capacity of the conversion table.

Setting the characteristic enables the grade of the image quality of printed images to be maintained without a rapid suppression (change) of gradation appearing particularly near the threshold value that limits the amount of toner adhesion. Moreover, this apparatus and method use a look table for each color, which enables the apparatus to be realized with a smaller memory capacity.

Figure 4:
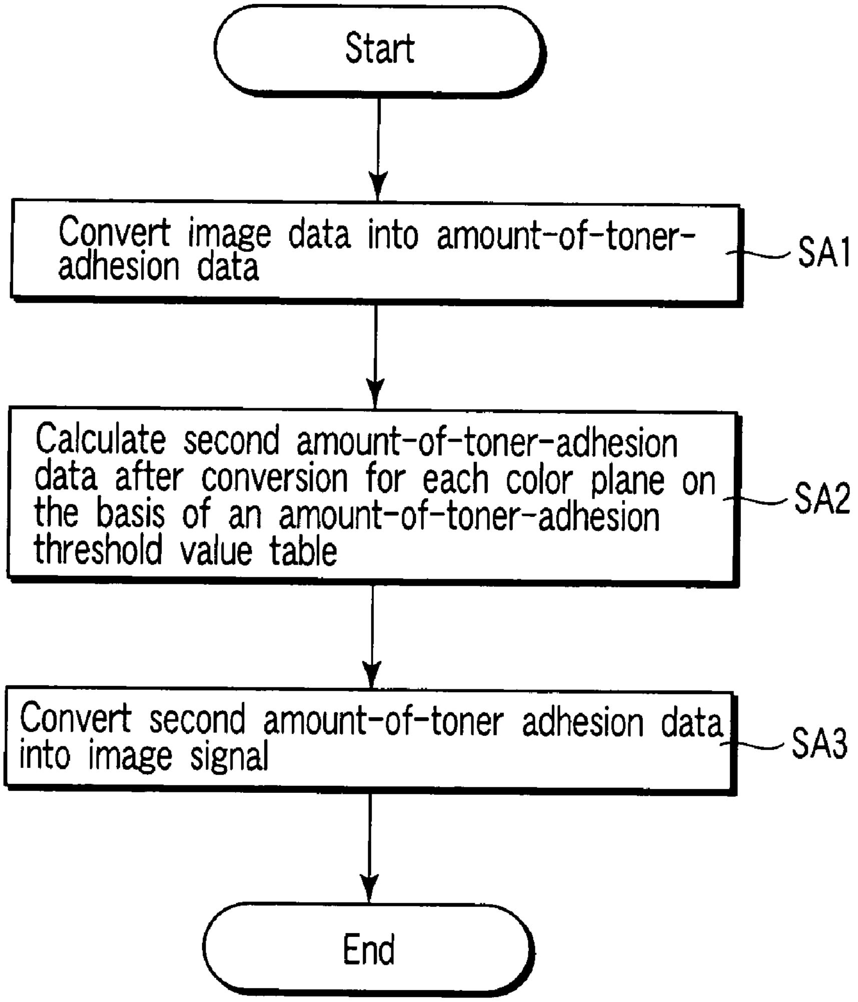
FIG. 4 is a flowchart to help explain the procedure for processing data in the invention.

FIG. 4 shows the procedure for an amount-of-toner limiting process carried out when the apparatus of the present invention makes prints. Specifically, in step SA1, image data is converted into the amount of toner adhesion. Next, in step SA2, the amount of adhesion after the limitation of the amount of toner adhesion is calculated for each plane on the basis of a preset amount-of-toner-adhesion threshold value table. That is, second amount-of-toner-adhesion data after conversion is obtained. Then, in step SA3, the amount of toner after the limitation of the amount of toner adhesion is converted into an image signal. The second amount-of-toner-adhesion data is converted into an image signal.

In the above explanation, the apparatus has processed the image data CMYK from the personal computer 100. This invention is not limited to this. For instance, the apparatus may process the image data from a scanner. In addition, the apparatus of the invention may be incorporated into an independent printer.

There is a relationship between the limitation of the amount of toner adhesion and the characteristic of printing paper, the color of printing paper, or the characteristic of toner itself. Therefore, the present invention is not limited to the above embodiment and may be embodied as follows.

Figure 5:
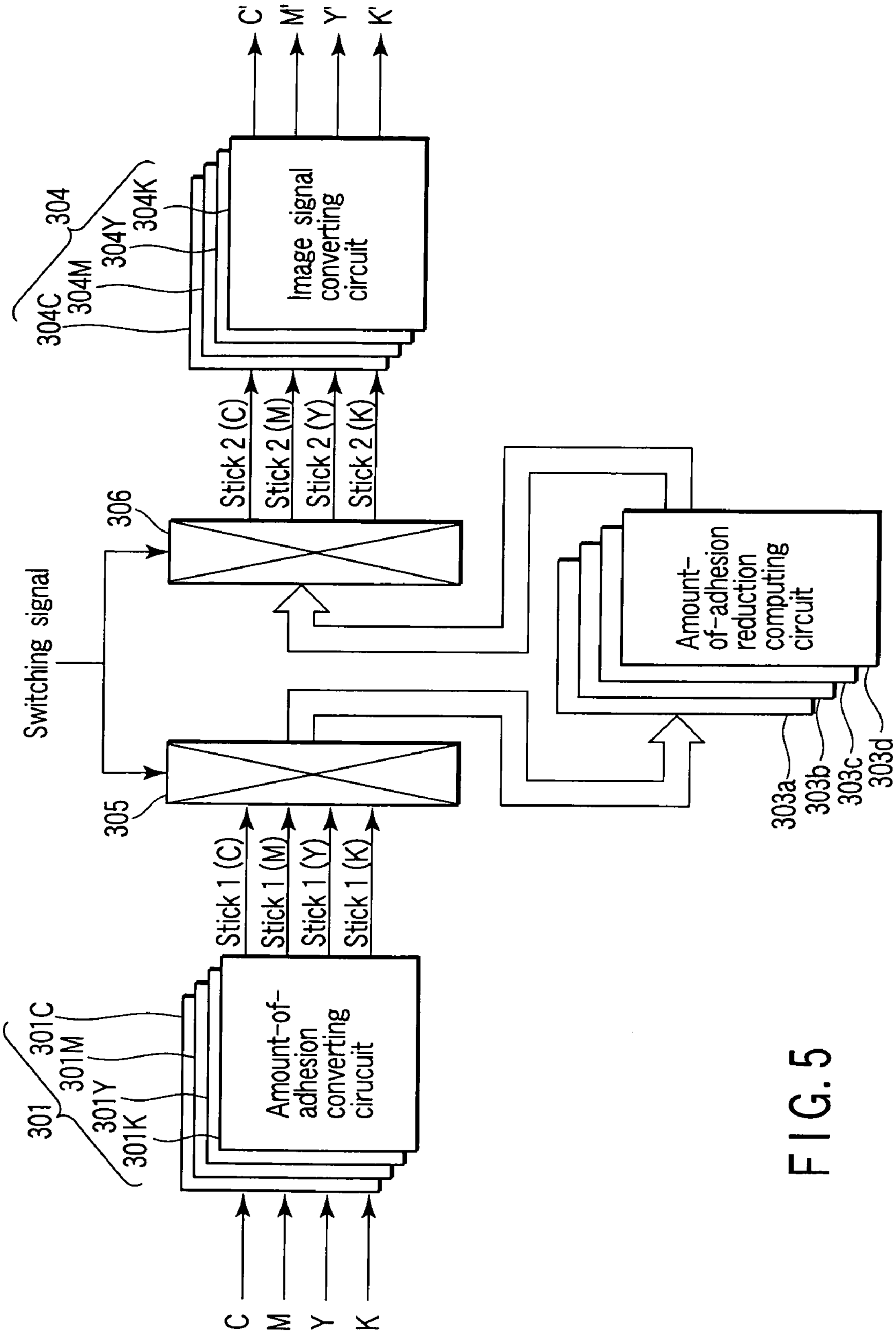
FIG. 5 shows another embodiment of the present invention.

FIG. 5 shows another embodiment of the present invention. This embodiment includes a plurality of amount-of-toner-adhesion reduction computing circuits 303*a*, 303*b*, 303*c*, 303*d*. Then, stick1 (C), stick1 (M), stick1 (Y), and stick1 (K) from the amount-of-adhesion converting circuit 301 are supplied to the amount-of-toner-adhesion reduction computing circuits 303*a*, 303*b*, 303*c*, or 303*d* selected by a selector 305. Then, the output stick2 (C), stick2 (M), stick2 (Y), or stick2 (K) of the selected amount-of-toner-adhesion reduction computing circuits 303*a*, 303*b*, 303*c*, or 303*d* is input to an image signal converting circuit 304 via a selector 306.

Here, according to external switching signals, the selectors 305 and 306 select the amount-of-toner-adhesion reduction computing circuits 303*a*, 303*b*, 303*c*, or 303*d*.

With this embodiment, the limiting characteristic of each of the amount-of-toner-adhesion reduction computing circuits 303*a*, 303*b*, 303*c*, 303*d* can be set to a different one, which makes it possible to prepare the amount-of-toner-adhesion reduction computing circuit best suited to the characteristic of printing paper, the color of printing paper, or the characteristic of toner itself.

Furthermore, this invention is not limited to the above embodiments and may be practiced or embodied in still other ways without departing from the spirit or essential character thereof. In addition, various inventions may be configured by suitably combining a plurality of component elements disclosed in the embodiments. For instance, some component elements may be eliminated from all of the component elements shown in each of the embodiments. Furthermore, the component elements related to different embodiments may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image signal processing method of limiting the amount of toner adhesion, comprising:

converting image data for each color plane into first amount-of-toner-adhesion data, the image data for each color plane being cyan (C), magenta (M), and yellow (Y);

on the basis of a preset amount-of-toner-adhesion threshold value table, converting the first amount-of-toner-adhesion data for each color plane into second amount-of-toner-adhesion data with a limited amount of toner adhesion;

the second amount-of-toner-adhesion data stick2 (C), stick2 (M), stick2 (Y), and stick2 (K) are calculated on the basis of the following equations:

$$stick2\ (C)=stick1\ (C)-(|all-limit|\times stick1\ (C)/all)$$

$$stick2\ (M)=stick1\ (M)-(|all-limit|\times stick1\ (M)/all)$$

$$stick2\ (Y)=stick1\ (Y)-(|all-limit|\times stick1\ (Y)/all)$$

$$stick2\ (K)=stick1\ (K)-(|all-limit|\times stick1\ (K)/all)$$

where limit is the threshold value setting table value, $$all=stick1\ (C)+stick1\ (M)+stick1\ (Y)+stick1\ (K)$$

stick1 (*) is the amount-of-adhesion value before change, * indicating CMYK, and stick2 [*] is the amount-of-adhesion value after change, * indicating CMYK; and converting the second amount-of-toner-adhesion data into an image signal.

2. The image signal processing method according to claim 1, wherein the image data for each color plane is data taken in via the scanner section of an image forming apparatus.

3. The image signal processing method according to claim 1, wherein the image data for each color plane is data output from a personal computer.

4. An image signal processing apparatus for limiting the amount of toner adhesion, comprising:

an amount-of-adhesion converting circuit which converts image data for each color plane into first amount-of-toner-adhesion data, the image data for each color plane being cyan (C), magenta (M), and yellow (y);

an amount-of-toner-adhesion reduction computing circuit which, on the basis of a preset amount-of-toner-adhesion threshold value table, converts the first amount-of-toner-adhesion data for each color plane into second amount-of-toner-adhesion data with a limited amount of toner adhesion;

the second amount-of-toner-adhesion data stick2 (C), stick2 (M), stick2 (Y), and stick2 (K) are calculated on the basis of the following equations:

$$stick2\ (C)=stick1\ (C)-(|all-limit|\times stick1\ (C)/all)$$

$$stick2\ (M)=stick1\ (M)-(|all-limit|\times stick1\ (M)/all)$$

$$stick2\ (Y)=stick1\ (Y)-(|all-limit|\times stick1\ (Y)/all)$$

$$stick2\ (K)=stick1\ (K)-(|all-limit|\times stick1\ (K)/all)$$

where limit is the threshold value setting table value, $$all=stick1\ (C)+stick1\ (M)+stick1\ (Y)+stick1\ (K)$$

stick1 (*) is the amount-of-adhesion value before change, * indicating *CMYK*, and stick2 [*] is the amount-of-adhesion value after change, * indicating *CMYK*; and an image signal converting circuit which converts the second amount-of-toner-adhesion data into an image signal.

5. The image signal processing apparatus according to claim 4, wherein the amount-of-adhesion converting circuit has an input terminal connected to the output of the scanner section of an image forming apparatus.

6. The image signal processing apparatus according to claim 4, wherein the amount-of-adhesion converting circuit has an input terminal connected to the output terminal of a personal computer.

7. The image signal processing apparatus according to claim 4, wherein a plurality of units of the amount-of-toner-adhesion reduction computing circuit are provided and any one of them is selected arbitrarily and used.

8. The image signal processing apparatus according to claim 7, further comprising selection means which selects any one of said plurality of amount-of-toner-adhesion reduction computing circuits.

9. The image signal processing apparatus according to claim 4, wherein the amount-of-toner reduction computing circuit selectively takes in CMYK image data obtained by subjecting RGB image data to the limitation of the amount of toner adhesion at a color converting section and CMYK image data without the limitation of the amount of toner adhesion.

10. The image signal processing apparatus according to claim 9, wherein the image signal converting circuit which converts the second amount-of-toner-adhesion data into an image signal has an output section connected to a gradating section.

11. A method of converting amount-of-toner-adhesion data into an image signal, comprising:

converting image data for each color plane into a plurality of first amount-of-toner-adhesion data;

on the basis of a preset amount-of-toner-adhesion threshold value table, converting each of the plurality of first amount-of-toner-adhesion data for each color plane into plurality of second amount-of-toner-adhesion data with a limited amount of toner adhesion, the second amount-of-toner-adhesion data being calculated based on the following process:

obtaining a total value of the plurality of first amount-of-toner-adhesion data;

providing a preset limiting value, which correspond to the total value, as the preset amount-of-toner-adhesion threshold value table, obtaining an absolute value by subtracting a corresponding preset limiting value from a corresponding total value;

obtaining a divided value by dividing the corresponding first amount-of-toner-adhesion data by a corresponding total value;

obtaining a multiplied value by multiplying the divided value and the corresponding absolute value; and subtracting the corresponding multiplied value from the corresponding first amount-of-toner-adhesion data, and, consequently, outputting the second amount-of-toner-adhesion data; and converting the second amount-of-toner-adhesion data into an image signal.

12. A method of converting amount-of-toner-adhesion data into an image signal according to the claim 11, wherein each of the plurality of the first amount-of-toner-adhesion data are cyan (C), magenta (M) and yellow (Y).

13. An image signal processing apparatus for converting an amount-of-toner-adhesion data into an image signal, comprising:

an amount-of-adhesion converting circuit which converts image data for each color plane into a plurality of first amount-of-toner-adhesion data;

an amount-of-toner-adhesion reduction computing circuit which, on the basis of a preset amount-of-toner-adhesion threshold value table, converts each of the plurality of first amount-of-toner-adhesion data for each color plane into a plurality of second amount-of-toner-adhesion data with a limited amount of toner adhesion, the second amount-of-toner-adhesion data being calculated based on the following process:

obtaining a total value of the plurality of first amount-of-toner-adhesion data;

providing a preset limiting value, which corresponds to the total value, as the preset amount-of-toner-adhesion threshold value table;

obtaining an absolute value by subtracting a corresponding preset limiting value from a corresponding total value;

obtaining a divided value by dividing the corresponding first amount-of-toner-adhesion data by a corresponding total value;

obtaining a multiplied value by multiplying the divided value and the corresponding absolute value; and subtracting the corresponding multiplied value from the corresponding first amount-of-toner-adhesion data; and an image signal converting circuit which converts the second amount-of-toner-adhesion data into an image signal.

14. An image signal processing apparatus according to claim 13, wherein the plurality of the first amount-of-toner-adhesion data are cyan (C), magenta (M) and yellow (Y).

* * * * *